(12) United States Patent
Yang (10) Patent No.: US 7,869,496 B1
(45) Date of Patent: Jan. 11, 2011

(54) ISI CANCELLATION EQUALIZER

(75) Inventor: Meng-Ta Yang, Miaoli County (TW)

(73) Assignee: Mediatek Inc., Hsin-Chu (TW)

( * ) Notice: Subject to any disclaimer, the term of this patent is extended or adjusted under 35 U.S.C. 154(b) by 587 days.

(21) Appl. No.: 12/025,082

(22) Filed: Feb. 4, 2008

(51) Int. Cl.
*H03H 7/30* (2006.01)

(52) U.S. Cl. ...................................................... 375/229

(58) Field of Classification Search .......... 375/229–236
See application file for complete search history.

(56) References Cited

U.S. PATENT DOCUMENTS

| | | | |
|---|---|---|---|
| 6,047,024 A * | 4/2000 | How | 375/229 |
| 6,278,675 B1 | 8/2001 | Kuribayashi et al. | |
| 6,414,989 B1 * | 7/2002 | Olafsson et al. | 375/229 |
| 6,816,547 B1 | 11/2004 | Kuribayashi | |
| 7,330,408 B2 * | 2/2008 | Sergey et al. | 369/47.17 |
| 2004/0170103 A1 | 9/2004 | Sergey et al. | |

* cited by examiner

*Primary Examiner*—Kevin Y Kim
(74) *Attorney, Agent, or Firm*—Thomas, Kayden, Horstemeyer & Risley (57) ABSTRACT

An ISI cancellation equalizer is disclosed. The ISI cancellation equalizer comprises a non-linear mapping circuit, a filter, a delay circuit, and a combiner. The non-linear mapping circuit generates a mapped signal by mapping a level of an input signal into a predetermined value when the input signal falls in a predetermined region, and linearly maps the level of the input signal when the level of the input signal is beyond the predetermined region. The filter depresses an inter-symbol interference (ISI) in the mapped signal to generate a filtered signal. The delay circuit filters the high boosted signal to generate a delayed signal. The combiner combines the filtered signal and the delayed signal to obtain an equalized signal.

17 Claims, 11 Drawing Sheets

ISI CANCELLATION EQUALIZER

BACKGROUND OF THE INVENTION

Field of the Invention

The invention relates to optical storage, and, more particularly, relates to techniques of signal re-production in an optical system.

A variety of optical storage media with different data capacities, such as CDs and DVDs are available. In order to increase the capacity of a disc with a certain fixed diameter, the track pitch and the channel bit length must be reduced, which requires a reduction of the laser spot size, i.e. a reduction of the used laser wave length.

In order to further increase storage density, the channel bit length is reduced to a higher degree than the gain in spot size reduction due to the shorter wave length, i.e. the ratio between the spot size and the channel bit length, which is known as the "information density", is increased.

In practice, the optical channel behaves like a low-pass filter and the transfer function is known as the modulation transfer function (MTF).

Figure 1A:
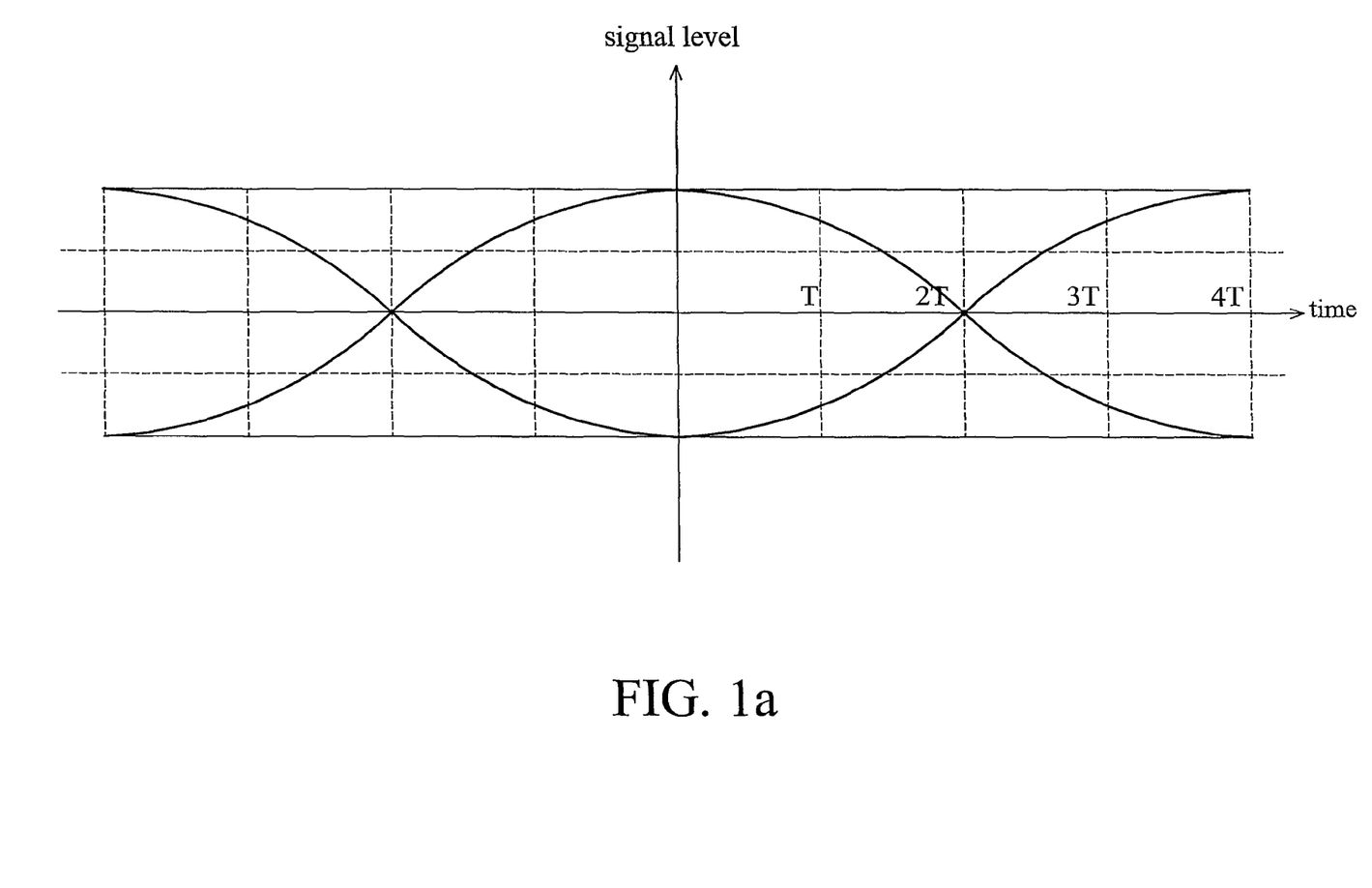
FIG. 1a and FIG. 1b respectively show an ideal signal eye pattern and the detected signal eye pattern.
Figure 1B:
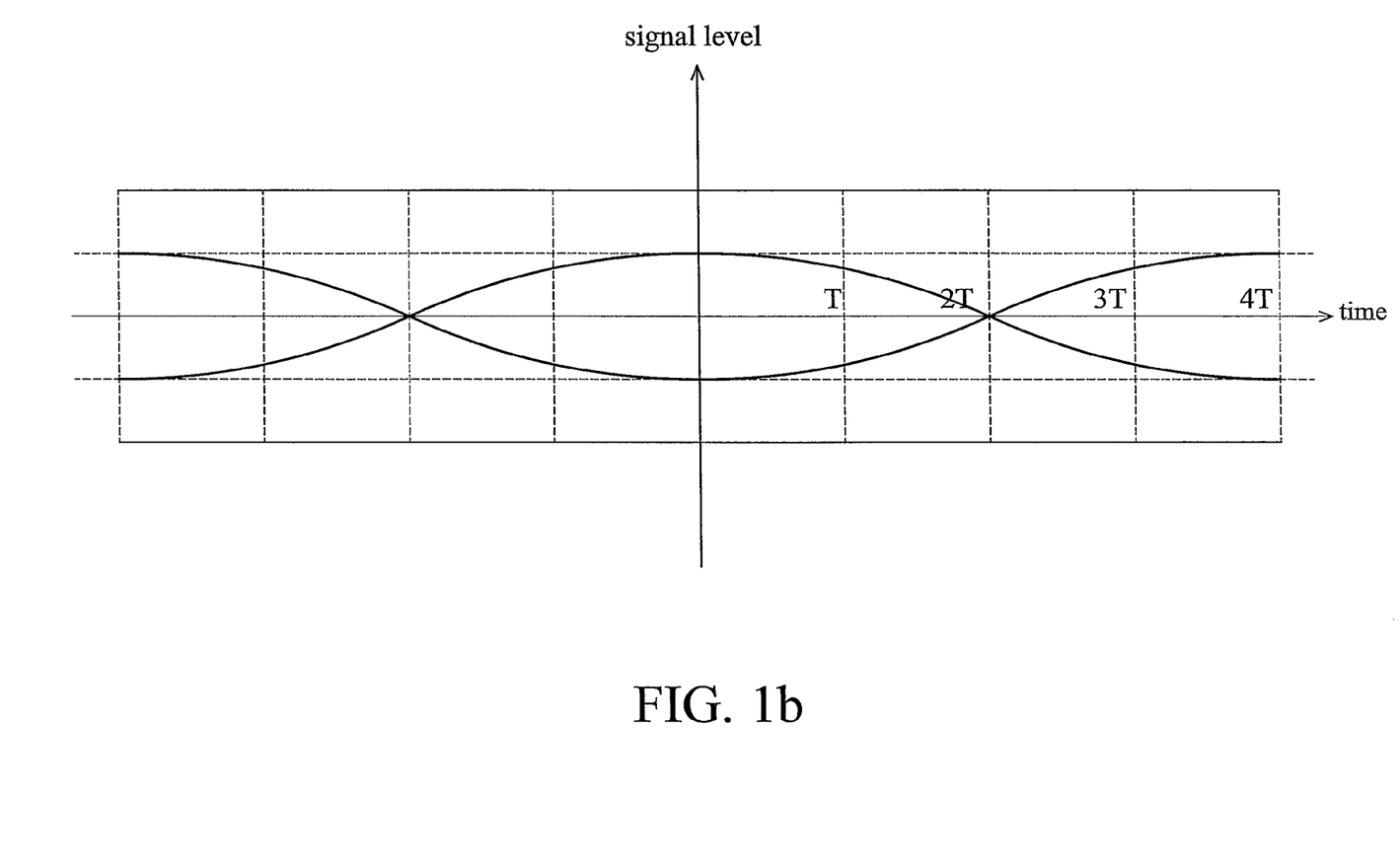

For high data storage densities on optical discs, the modulation transfer function drops very steeply, i.e. the high frequency components of the analog read signal are attenuated considerably compared to the low frequency components. The attenuation of the optical channel leads to the value of the detected signal failing to achieve ideal signal values due to the intersymbol interference ("ISI"). FIG. 1a and FIG. 1b respectively show an ideal signal eye pattern and the detected signal eye pattern. The ideal signal eye pattern (FIG. 1a) shows a 'bigger eye' (larger pick-to-pick value) than the detected signal eye pattern, certainly the detected signal has worse quality than the idea signal.

One conventional technique for compensating for this problem is to increase the effective level of the signal, thereby increasing the potential distance between detected signals representing values of unity and 0. This technique, however, may become less effective at high data rates.

BRIEF SUMMARY OF THE INVENTION

Accordingly, a compensation technique for reducing ISI products is desirable. In one aspect of the invention, an ISI cancellation equalizer is provided. The ISI cancellation equalizer comprises a non-linear mapping circuit, a filter, a delay circuit, and a combiner. The non-linear mapping circuit generates a mapped signal by mapping a level of an input signal into a predetermined value when the input signal falls in a predetermined region, and linearly maps the level of the input signal when the level of the input signal is beyond the predetermined region. The filter depresses an inter-symbol interference (ISI) in the mapped signal to generate a filtered signal. The delay circuit filters the high boosted signal to generate a delayed signal. The combiner combines the filtered signal and the delayed signal to obtain an equalized signal.

In another aspect of the invention, an ISI cancellation equalizer may comprise a signal detector, and first and second high boost filters. The signal detector determines whether the input signal matches an erasure requirement. If the input signal matches the erasure requirement, the signal detector delivers an erasure signal $R_{era}$ to the first high boost filter and sets the mapped signal $R_{map}$ to zero; otherwise, the signal detector delivers a mapped signal $R_{map}$ to the second high boost filter and sets the erasure signal $R_{era}$ to zero. The first and second high boost filters have first and second high boost coefficients respectively. The first high boost filter filters the erasure signal $R_{era}$ to form a first high boosted signal. The second high boost filter filters the mapped signal $R_{map}$ with a second high boost coefficient to form a second high boosted signal. A delay circuit delays the input signal. A combiner combines the first and the second high boosted signal with the delayed signal to generate an equalized signal.

In yet another embodiment of the invention, an ISI cancellation equalizer comprises a signal detector and a high boost filter. The signal detector determines whether an input signal matches an erasure requirement. If the input signal matches the erasure requirement, the signal detector sets an erasure flag $f_{era}$ and delivers a detected signal $R_{det}$ to the high boost filter. The high boost filter has an adjustable high boost coefficient for amplifying the high frequency components of the signal. When the erasure flag $f_{era}$ is set, the high boost filter filters the detected signal $R_{det}$ with a first high boost coefficient. If the erasure flag $f_{era}$ is not set, the high boost filter filters the detected signal $R_{det}$ with a second high boost coefficient. A delay circuit filters the high boosted signal to generate a delayed signal for equalizing a delay time of the high boosted signal and the delayed signal. A combiner combines the high boosted signal with the delayed signal to generate an equalized signal.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 2:
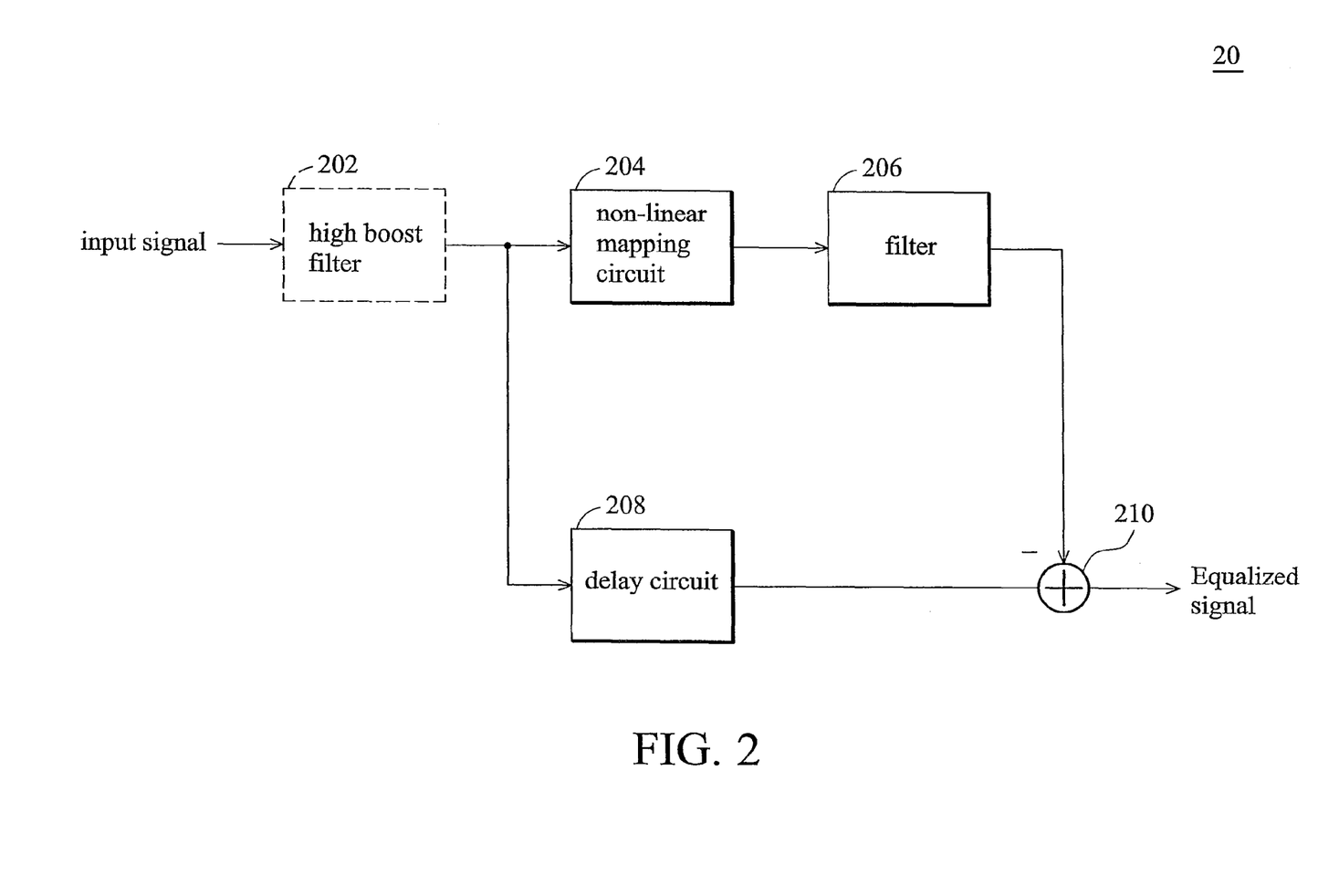
FIG. 2 shows an ISI cancellation equalizer according to an embodiment of the invention.

FIG. 2 shows an ISI cancellation equalizer 20 according to an embodiment of the invention. The ISI cancellation equalizer 20 comprises a non-linear mapping circuit 204, a filter 206, a delay circuit 208, and a combiner 210. The non-linear mapping circuit 204 maps the input signal into a mapped signal. When the input signal falls within a predetermined region, the input signal is mapped to a predetermined value, and when the input signal is out of the predetermined region, the level of the input signal is linearly mapped. The predetermined region of the non-linear mapping circuit is between a first and a second threshold.

Figure 3:
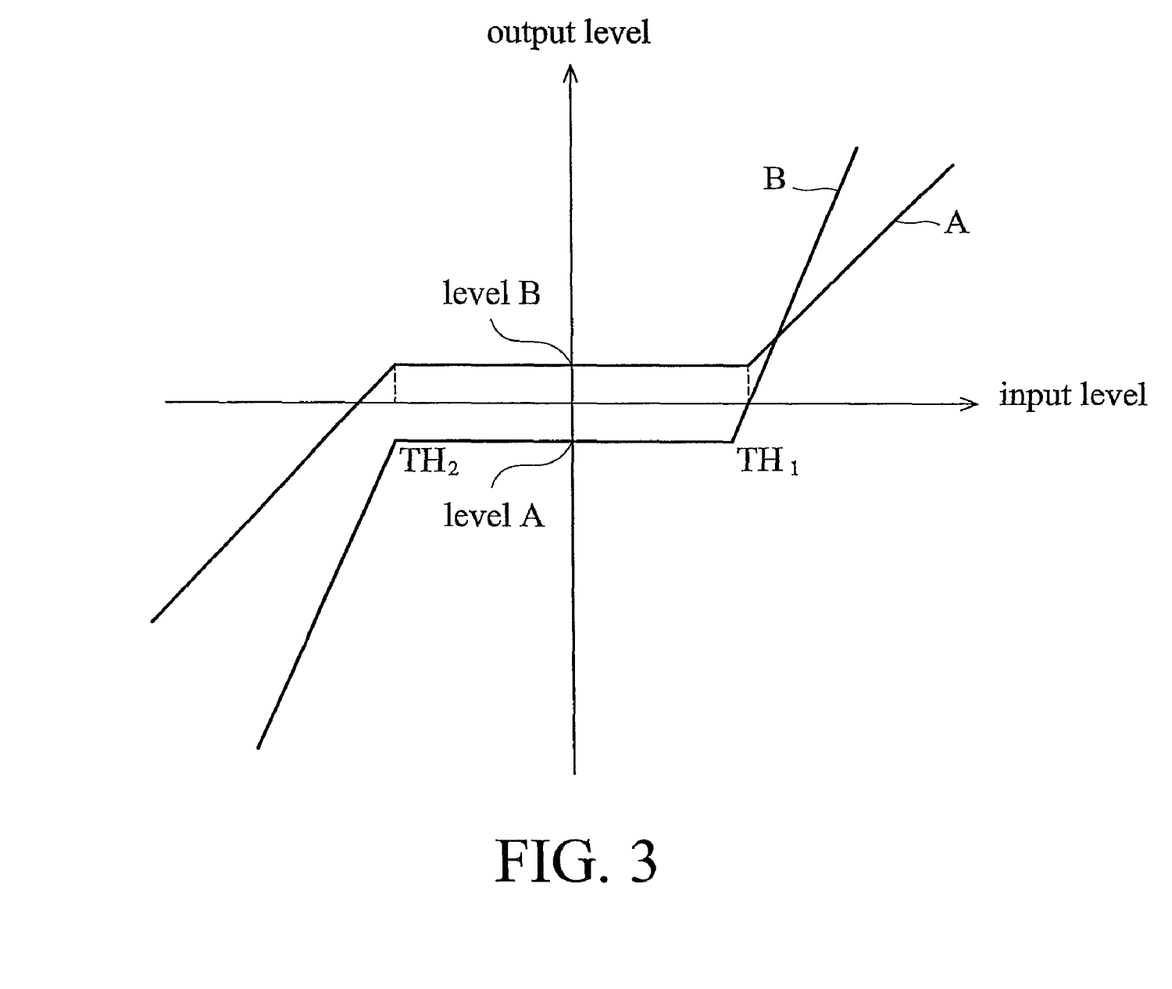
FIG. 3 shows an example of non-linear mapping.

FIG. 3 shows an example of non-linear mapping. When the high boosted signal is less than the first threshold $TH_1$ and exceeds the second threshold $TH_2$, the non-linear mapping circuit 204 maps the high boosted signal to a fixed output level. Note that the mapping function (line A and line B, for example) of the non-linear mapping circuit may vary. That is, the slope, the mapped output levels and the thresholds are adjustable according to requirements.

The filter 206 depresses the ISI in a mapped signal to generate an ISI-canceled signal. The delay circuit 208 delays the input signal to generate a delayed signal for matching the delay time between the ISI-canceled signal and the delayed signal. The combiner 210 substrates the delayed signal with the filtered signal to generate an equalized signal. The high boost filter 202 and the filter 206 can be implemented by FIR (finite impulse response) filters. In some embodiments, the ISI cancellation equalizer 20 may further comprise a high boost filter 202 to amplify the high frequency RF signal components on the input signal to be a high boosted signal. In such cases, the non-linear mapping circuit 204 and the delay circuit 208 process the high boosted signal (from high boost filter 202) rather than the input signal.

Figure 4:
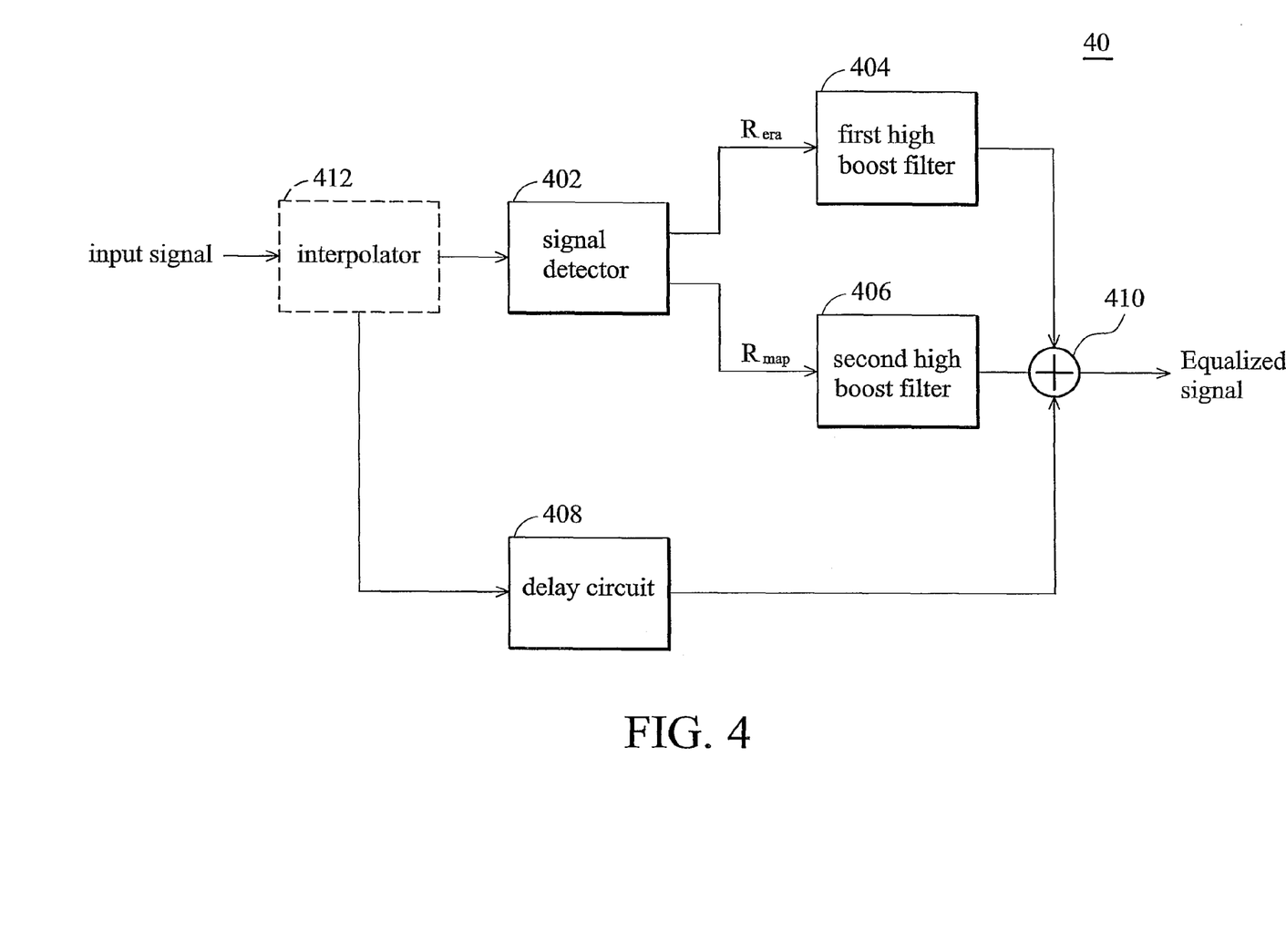
FIG. 4 shows another block diagram of an ISI cancellation equalizer in an embodiment of the invention.

FIG. 4 shows another block diagram of an ISI cancellation equalizer 40 of an embodiment of the invention. The ISI cancellation equalizer 40 comprises a signal detector 402, a first and a second high boost filters 404 and 406. The signal detector 402 determines whether the input signal matches an erasure requirement, wherein the erasure requirement is arranged to estimate whether the signal being processed has enough good quality or not. Then, the signal detector 402 decides how to deal with the input signal being processed according to the estimation result. If the input signal matches the erasure requirement, the signal detector 402 delivers an erasure signal $R_{era}$ to the first high boost filter 404 and sets the mapped signal $R_{map}$ to be zero (or one); otherwise, the signal detector 402 delivers a mapped signal $R_{map}$ to the second high boost filter 406 and sets the erasure signal $R_{era}$ to be zero (or zero). The first and second high boost filters 404 and 406 have first and second high boost coefficients respectively. The first high boost filter 404 filters the erasure signal $R_{era}$ to form a first high boosted signal. The second high boost filter 406 filters the mapped signal $R_{map}$ with a second high boost coefficient to form a second high boosted signal. Since the signal detector 402 marks the input signals as erasure signals $R_{era}$ according to the estimation result, interference (such as the interference caused by slicing) can be reduced thereby.

A delay circuit 408 delays the input signal. A combiner 410 combines the first and the second high boosted signal with the delayed signal to generate an equalized signal. In some embodiments, the ISI cancellation equalizer 40 further comprises an interpolator 412 for interpolating the input signal. In such cases, the signal detector 402 and the delay circuit 408 process the interpolated signal (from the interpolator 412) rather than the input signal.

Figure 5:
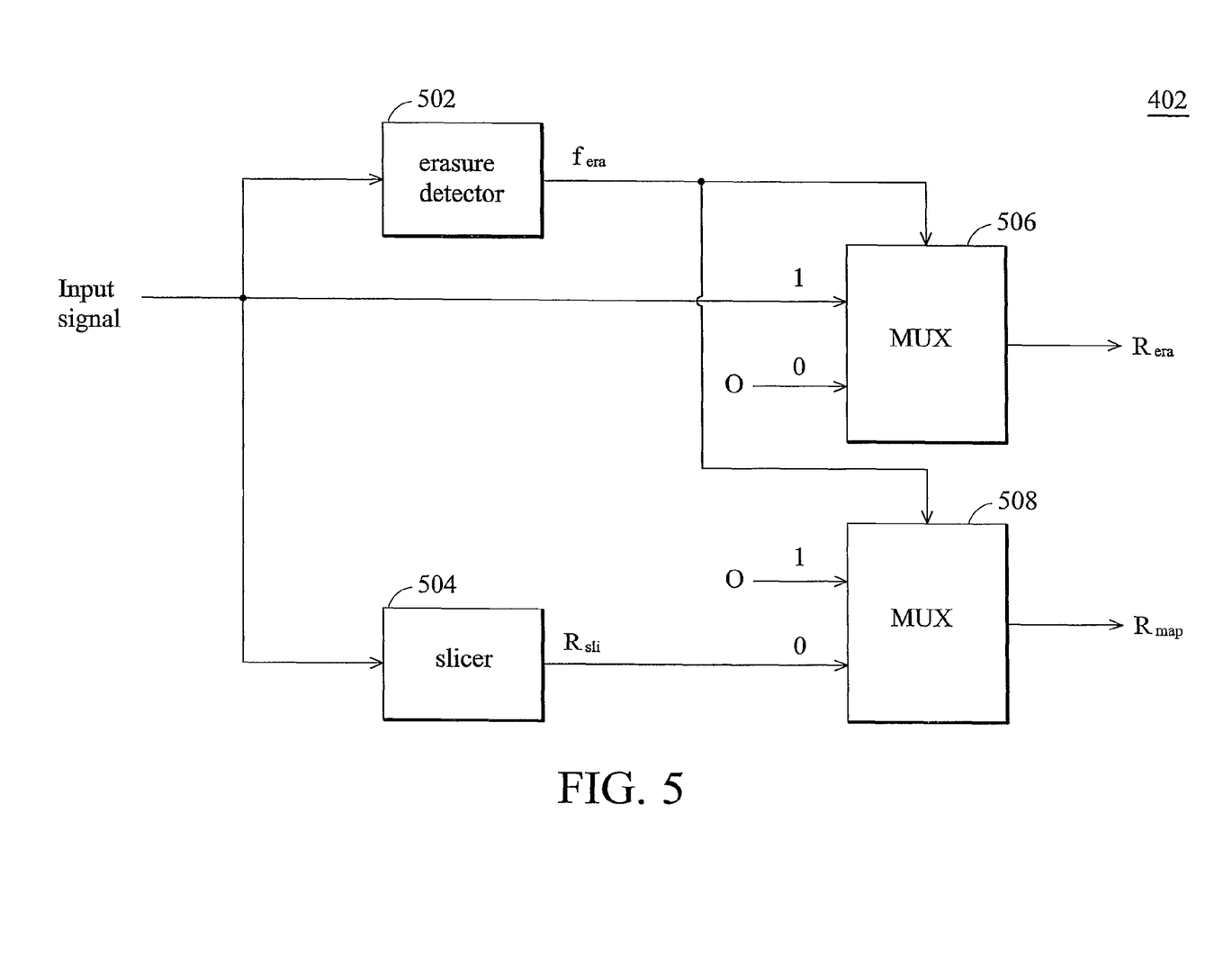
FIG. 5 shows an example of the signal detector according to an embodiment of the invention.

FIG. 5 shows an example of the signal detector 402 according to an embodiment of the invention. The signal detector 402 may comprise an erasure detector 502, a slicer 504, first and second multiplexers 506 and 508. The erasure detector 502 detects if the input signal matches the erasure requirement, and sets an erasure flag $f_{era}$ when the input signal matches the erasure requirement. The slicer 504 maps the input signal to either logic high "H" or logic low "L" to form a sliced signal $R_{sli}$. When the erasure flag $f_{era}$ is set, the first multiplexer 506 outputs the input signal as the erasure signal $R_{era}$, and the second multiplexer 508 outputs a zero signal. If the input signal does not match the erasure requirement, the first multiplexer 506 outputs a zero signal and the second multiplexer 508 outputs the sliced signal $R_{sh}$ as the mapped signal $R_{map}$.

Figure 6:
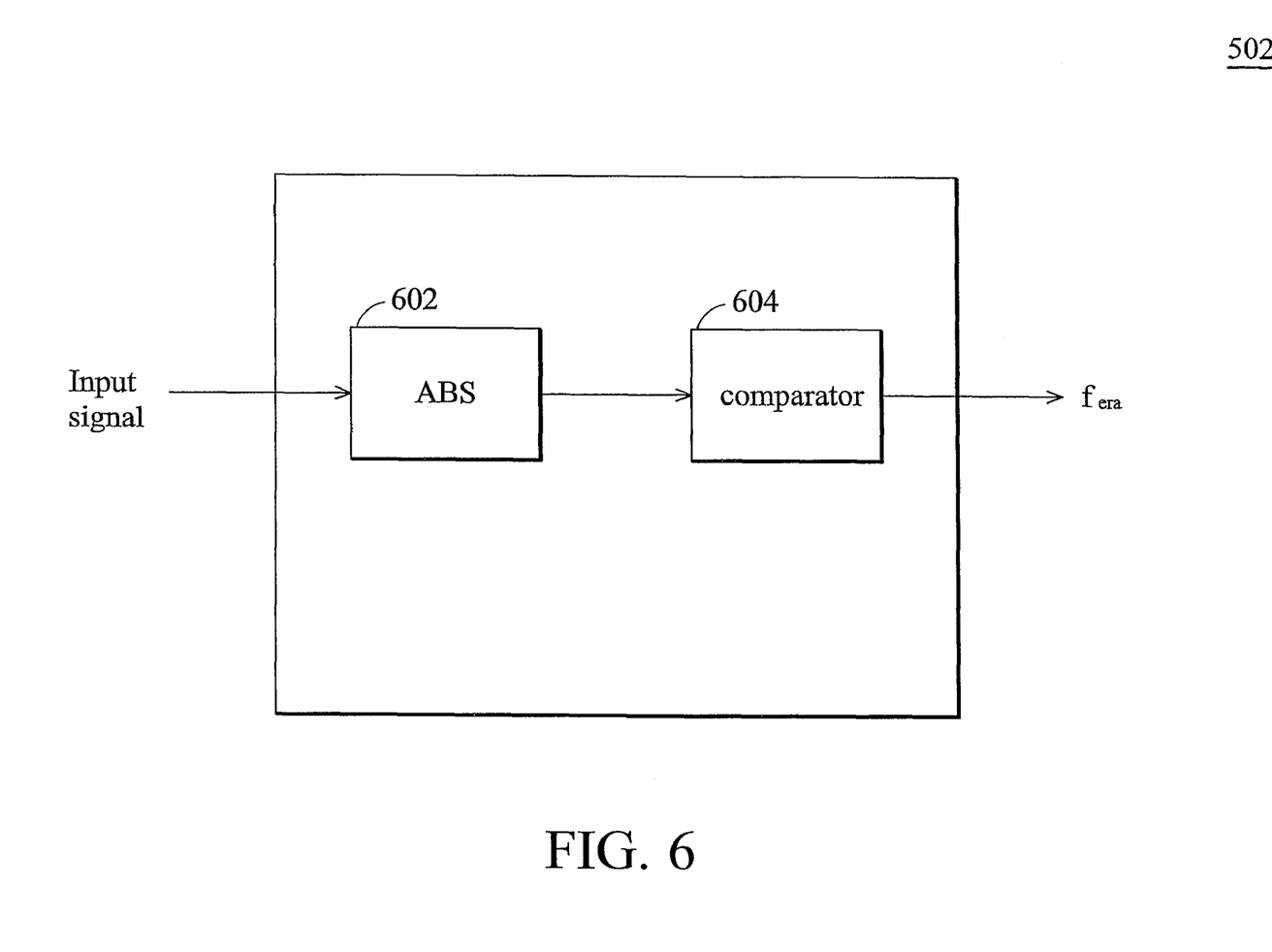
FIG. 6 shows an exemplary block diagram of an erasure detector.

FIG. 6 shows an exemplary block diagram of an erasure detector 502. The erasure detector 502 comprises an absolute value unit (ABS) 602 and a comparator 604. The absolute value unit 602 generates an absolute value of the input signal for processing by the comparator 604. The comparator 604 compares the absolute value with a threshold, and sets the erasure flag $f_{era}$ when the absolute value is less than the threshold. Note that the value of the threshold in the comparator 604 may be varied under different working environments.

Figure 7:
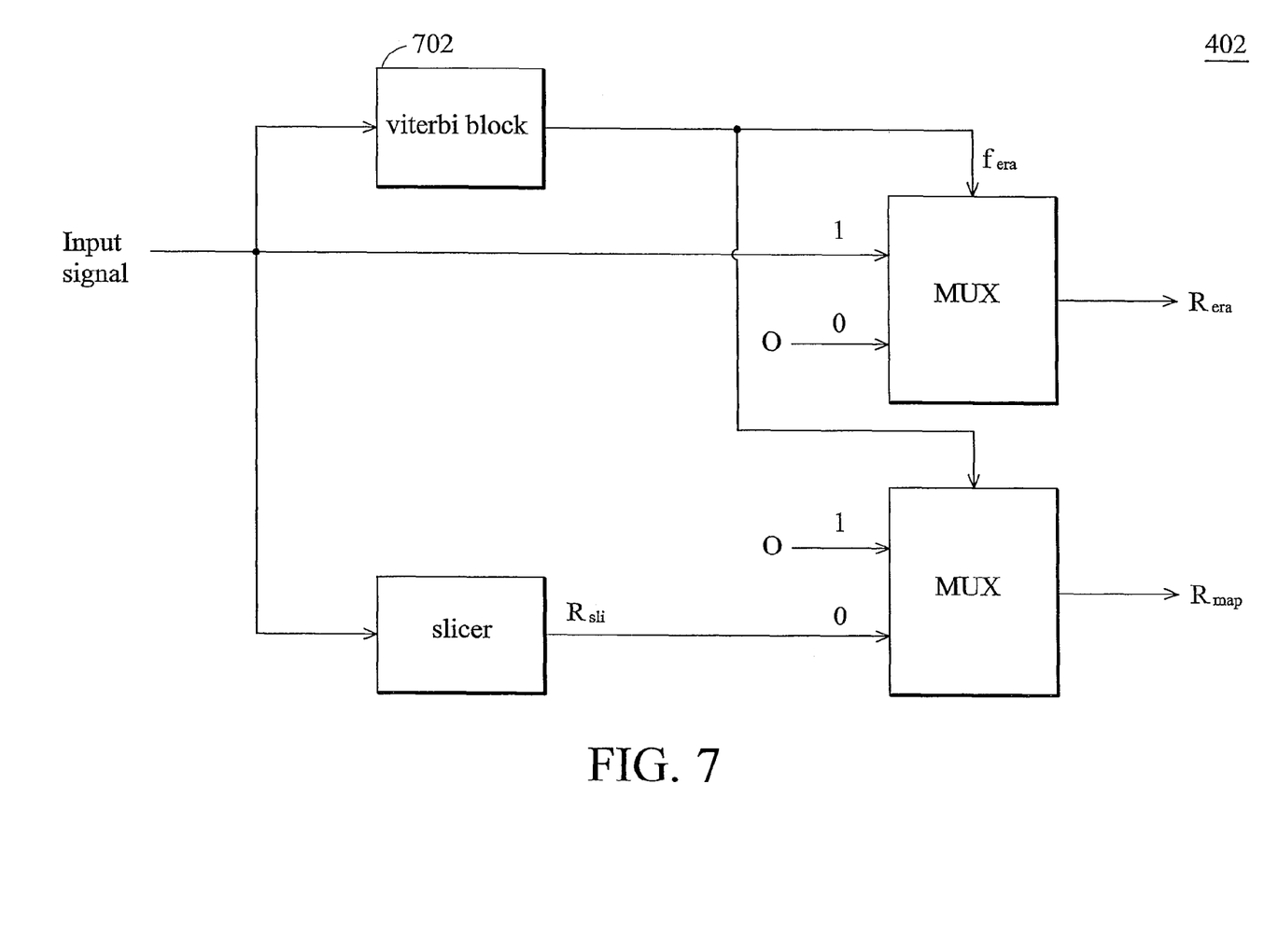
FIG. 7 shows another block diagram of an signal detector.

In some embodiments, the erasure detector 502 may be replaced by a Viterbi block, as shown in FIG. 7. Viterbi block 702 distinguishes possible and erasure transitions. When the erasure transitions are detected, the Viterbi block sets the erasure flag $f_{era}$. For example, suppose the input signal is encoded by a run-length limit coding, and the minimum transition intervals of the input signal is 2T (T is time unit). Thus, when the Viterbi block 702 detects any transition interval less than 2T, the erasure flag $f_{era}$ is set.

Figure 8:
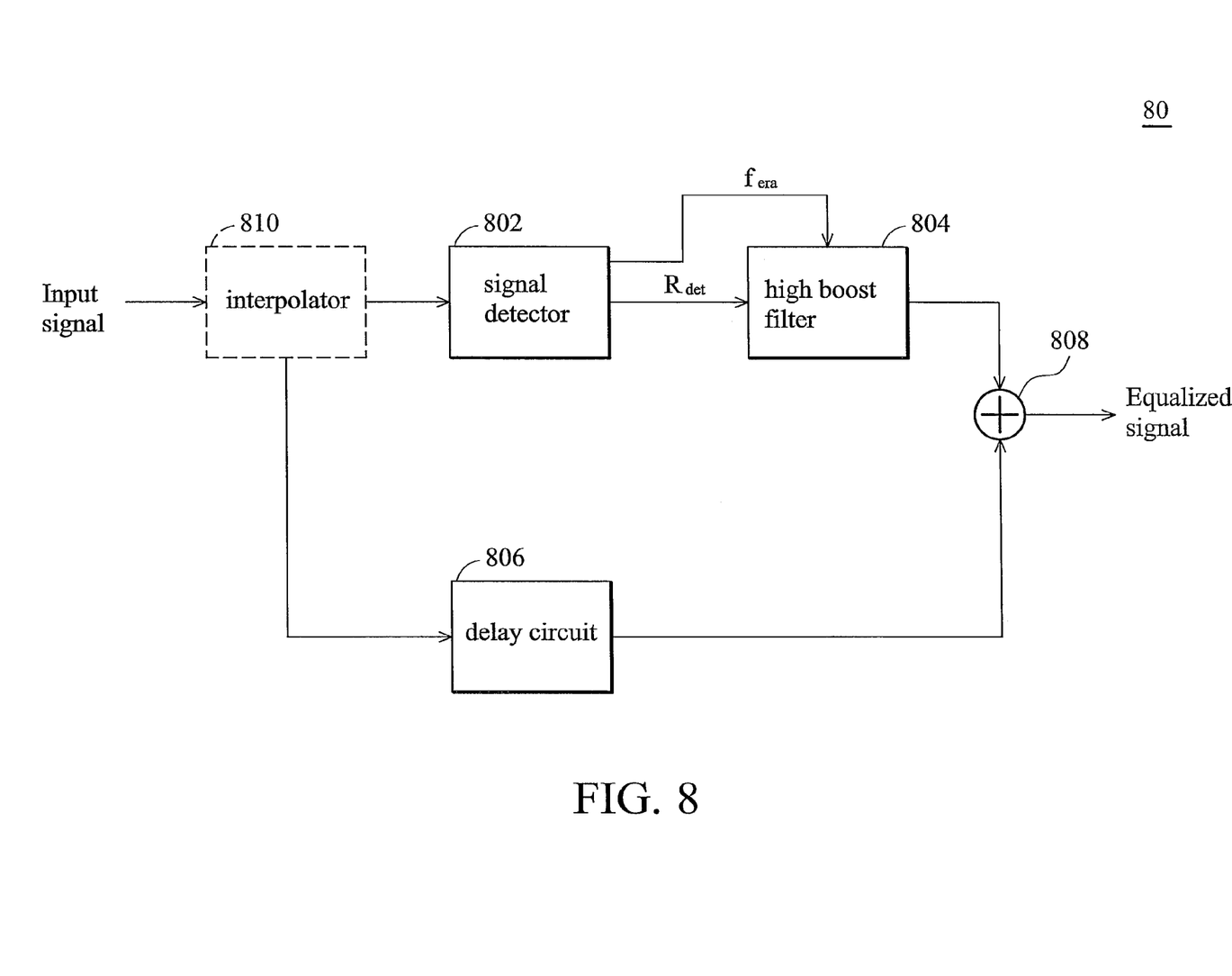
FIG. 8 shows another block diagram of an ISI cancellation equalizer according to an embodiment of the invention.

FIG. 8 shows another block diagram of an ISI cancellation equalizer 80 according to an embodiment of the invention. The ISI cancellation equalizer 80 comprises a signal detector 802 and a high boost filter 804. The signal detector 802 determines whether an input signal matches an erasure requirement. If the input signal matches the erasure requirement, the signal detector 802 sets an erasure flag $f_{era}$ and delivers a detected signal $R_{det}$ to the high boost filter 804. The high boost filter 804 has adjustable high boost coefficient for amplifying the high frequency components of the input signal. When the erasure flag $f_{era}$ is set, the high boost filter 804 filters the detected signal $R_{det}$ with a first high boost coefficient. If the erasure flag $f_{era}$ is not set, the high boost filter 804 filters the detected signal $R_{det}$ with a second high boost coefficient. A delay circuit 806 filters the high boosted signal to generate a delayed signal for equalizing a delay time of the high boosted signal and the delayed signal. A combiner 808 combines the high boosted signal with the delayed signal to generate an equalized signal. In some embodiments, the ISI cancellation equalizer further comprises an interpolator 810 for interpolating the input signal. In this case, the signal detector 802 and the delay circuit 806 process the interpolated signal instead of the input signal. The high boost filter 804 can be implemented by FIR (finite impulse response) filters.

Figure 9:
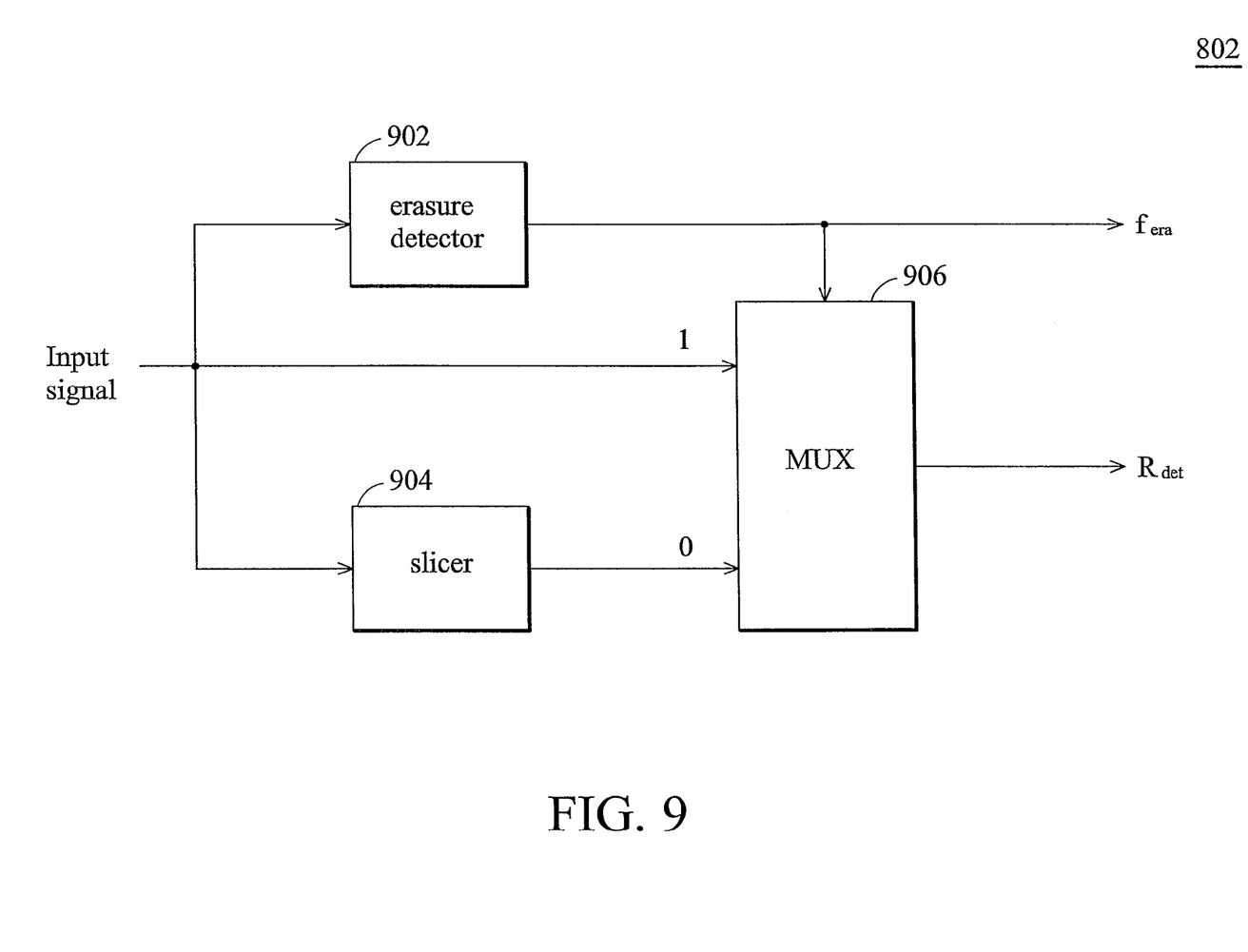
FIG. 9 shows an example of a signal detector.

The signal detector 802 may take various structures. FIG. 9 shows an example of a signal detector. The signal detector may comprise an erasure detector 902, a slicer 904, and a multiplexer 906. The erasure detector 902 detects if the input signal matches the erasure requirement, and sets the erasure flag $f_{era}$ when the input signal matches the erasure requirement. The slicer 904 maps the input signal to either logic high "H" or logic low "L". In some embodiments, the mapped signal is either 1 or −1. The output of the multiplexer 906 is the sliced signal when the erasure flag $f_{era}$ is not set; otherwise, the output of the multiplexer 906 is the input signal.

The erasure detector 902 may substantially the same as that shown in FIG. 6. In some embodiments, the erasure detector 902 may be a Viterbi block. Viterbi blocks can distinguish possible transitions and erasure transitions. When erasure transitions are detected, the Viterbi blocks sets the erasure flag $f_{era}$. For example, in run-length limited coding, the interval of two transitions is at least 2 time units (2T). When the interval of two transitions is only 1T, an erasure is detected by the Viterbi block.

In some embodiments, the signal detector 802 can be implemented by a soft output Viterbi block. The soft output Viterbi block always sets the erasure flag $f_{era}$, and delivers a soft decision output as the detected signal $R_{det}$ to the high boost filter. The soft decision output includes the information about the quality of the signal being processed, such as possible transition or the probability of the bad quality signal.

Figure 10:
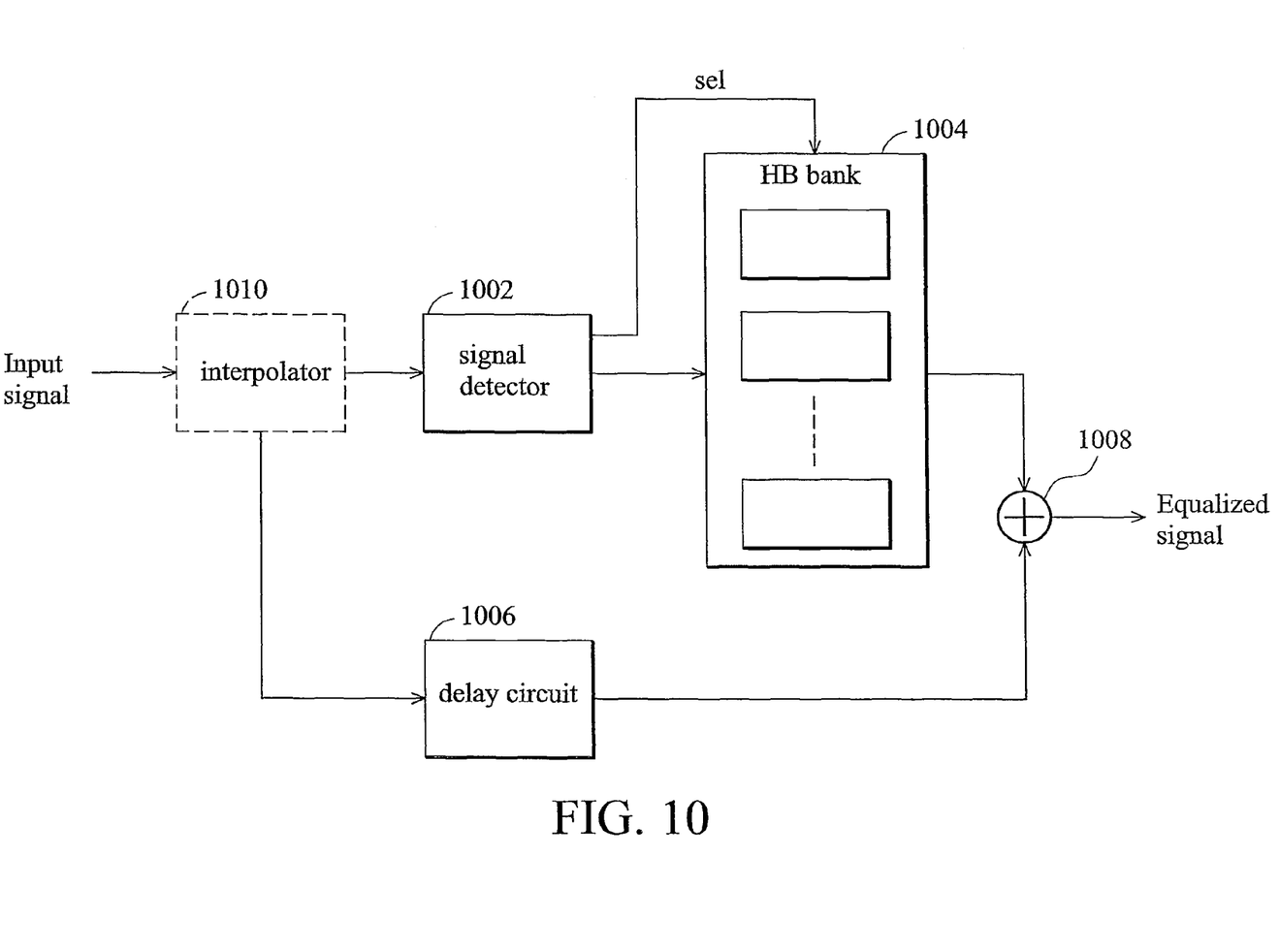
FIG. 10 shows another exemplary block diagram of an ISI cancellation equalizer.

FIG. 10 shows another exemplary block diagram of an ISI cancellation equalizer. The ISI cancellation equalizer comprises a high boost bank 1004 to correspondingly filter the different input signals. The high boost bank 1004 comprises multiple high boost filters, and each high boost filter has individual high boost coefficient. A selection signal (sel) is sent from a signal detector 1002 to the high boost bank so that the input signal is filtered by a proper high boost filter. A delay circuit 1006 filters the high boosted signal to generate a delayed signal for equalizing a delay time of the high boosted signal and the delayed signal. A combiner 1008 combines the high boosted signal with the delayed signal to generate an equalized signal. In some embodiments, the ISI cancellation equalizer further comprises an interpolator 1010 for interpolating the input signal.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An equalizer, comprising:
   a non-linear mapping circuit generating a mapped signal by mapping a level of an input signal into a predetermined value when the input signal falls in a predetermined region, and linearly mapping the level of the input signal when the level of the input signal is beyond the predetermined region;
   a filter depressing an inter-symbol interference (ISI) in the mapped signal to generate a filtered signal;
   a delay circuit filtering the high boosted signal to generate a delayed signal; and
   a combiner combining the filtered signal and the delayed signal to obtain a equalized signal.

2. The equalizer as claimed in claim 1, further comprising a high boost filter (202) to amplify a high frequency component of the input signal to be a high boosted signal for the non-linear mapping circuit.

3. The equalizer as claimed in claim 1, wherein the predetermined region of the non-linear mapping circuit is between a first and a second threshold.

4. The equalizer as claimed in claim 1, wherein the high boost filter is a finite impulse response (FIR) filter.

5. The equalizer as claimed in claim 1, wherein the filter is a FIR filter.

6. The equalizer as claimed in claim 1, wherein the combiner substrates the delayed signal with the filtered signal.

7. An equalizer for equalizing an input signal, comprising:
   an signal detector determining whether the input signal matches an erasure requirement, generating an erasure signal $R_{era}$ and setting a mapped signal $R_{map}$ to be zero when the input signal matches the erasure requirement, and generating the mapped signal $R_{map}$ and setting the erasure signal $R_{era}$ to be zero when the input signal does not match the erasure requirement;
   a first high boost filter having a first high boost coefficient and filtering the erasure signal $R_{era}$ to form a first high boosted signal;
   a second high boost filter having a second high boost coefficient and filtering the mapped signal $R_{map}$ to form a second high boosted signal;
   a delay circuit filtering the input signal to generate a delayed signal; and
   a combiner combining the first, the second high boosted signals, and the delayed signal to generate a equalized signal.

8. The equalizer as claimed in claim 7, wherein the signal detector comprises:
   an erasure detector determining whether the input signal matches the erasure requirement and settings an erasure flag $f_{era}$ when the input signal matches the erasure requirement;
   a slicer mapping the input signal to either logic high or logic low to obtain a sliced signal $R_{sli}$;
   a first multiplexer outputting the input signal as the erasure signal $R_{era}$ when the erasure flag $f_{era}$ is set, and outputting a zero signal when the erasure flag $f_{era}$ is not set; and
   a second multiplexer outputting the zero signal when the erasure flag $f_{era}$ is set, and outputting the sliced signal $R_{sli}$ as the mapped signal $R_{map}$ when the erasure flag $f_{era}$ is not set.

9. The equalizer as claimed in claim 8, wherein the erasure detector comprises:
   an absolute value unit generating an absolute value of the input signal; and
   a comparator comparing the absolute value with a threshold, and setting the erasure flag $f_{era}$ when the absolute value is less than the threshold.

10. The equalizer as claimed in claim 8, wherein the erasure detector is a Viterbi block to detect possible transitions and setting the erasure flag $f_{era}$.

11. The equalizer as claimed in claim 10, wherein the input signal is coded by run-length limit coding.

12. The equalizer as claimed in claim 11, wherein a minimum transition interval of the input signal is 2T.

13. An equalizer, comprising:
   a signal detector determining whether an input signal matches an erasure requirement, outputting a detected signal $R_{det}$ and setting an erasure flag $f_{era}$ when the input signal matches an erasure requirement;
   a high boost filter having an adjustable high boost coefficient for amplifying the high frequency components of the detected signal, filtering the detected signal $R_{det}$ with a first high boost coefficient when the erasure flag $f_{era}$ is set, and filtering the detected signal $R_{det}$ with a second high boost coefficient when the erasure flag $f_{era}$ is not set;
   a delay circuit filtering the high boosted signal to generate a delayed signal; and
   a combiner combining the high boosted signal and the delayed signal to generate a equalized signal.

14. The equalizer as claimed in claim 13, wherein the signal detector comprises:
   an erasure detector determining whether the input signal matches the erasure requirement, and settings the erasure flag $f_{era}$ when the input signal matches the erasure requirement;
   a slicer mapping the input signal to either logic high "H" or logic low "L" to obtain a sliced signal; and
   a multiplexer bypassing the input signal as the detected signal $R_{det}$ when the erasure flag $f_{era}$ is set, and outputting the sliced signal as the detected signal $R_{det}$ when the erasure flag $f_{era}$ is not set.

15. The equalizer as claimed in claim 14, wherein the erasure detector comprises:
   an absolute value unit generating an absolute value of the input signal; and
   a comparator comparing the absolute value and a threshold, and setting the erasure flag $f_{era}$ when the absolute value is less than the threshold.

16. The equalizer as claimed in claim 14, wherein the erasure detector is a Viterbi block to set the erasure flag $f_{era}$.

17. The equalizer as claimed in claim 13, wherein the signal detector is a soft output Viterbi block, wherein the soft output Viterbi block sets the erasure flag $f_{era}$, and delivers a soft decision output as the detected signal $R_{det}$ to the high boost filter.

* * * * *